United States Patent
Brooks et al.

(10) Patent No.: US 10,338,801 B2
(45) Date of Patent: Jul. 2, 2019

(54) AGRICULTURAL VEHICLE CALIBRATION VIA HUMAN MACHINE INTERFACE

(71) Applicant: CNH Industrial America LLC, New Holland, PA (US)

(72) Inventors: Nathan Paul Brooks, Manitowoc, WI (US); Kerry J. Treinen, Malone, WI (US)

(73) Assignee: CNH Industrial America LLC, New Holland, PA (US)

( * ) Notice: Subject to any disclaimer, the term of this patent is extended or adjusted under 35 U.S.C. 154(b) by 168 days.

(21) Appl. No.: 15/082,705

(22) Filed: Mar. 28, 2016

(65) Prior Publication Data

US 2016/0318465 A1  Nov. 3, 2016

Related U.S. Application Data

(60) Provisional application No. 62/154,806, filed on Apr. 30, 2015.

(51) Int. Cl.

| | |
|---|---|
| *A01B 76/00* | (2006.01) |
| *B60K 35/00* | (2006.01) |
| *B60R 16/023* | (2006.01) |
| *G06F 3/0488* | (2013.01) |
| *B60K 17/356* | (2006.01) |
| *F16H 61/448* | (2010.01) |

(Continued)

(52) U.S. Cl.
CPC ......... *G06F 3/0488* (2013.01); *A01M 7/0089* (2013.01); *B60K 17/356* (2013.01); *B60K 35/00* (2013.01); *F16H 61/448* (2013.01); *G06F 3/04847* (2013.01); *B60K 2350/1004* (2013.01); *B60K 2350/1032* (2013.01); *B60K 2350/1048* (2013.01); *B60Y 2200/224* (2013.01)

(58) Field of Classification Search
CPC .......... B60K 17/356; B60K 2350/1004; B60K 2350/1032; B60K 2350/1048; B60K 35/00; B60Y 2200/224; F16H 61/448; G06F 3/0488
See application file for complete search history.

(56) References Cited

U.S. PATENT DOCUMENTS

| | | |
|---|---|---|
| 6,181,328 B1 | 1/2001 | Shieh et al. |
| 6,804,587 B1 | 10/2004 | O Connor et al. |
| 6,882,917 B2 | 4/2005 | Pillar et al. |

(Continued)

OTHER PUBLICATIONS

Raven Industries Inc.: "Viper Pro TM"; Installation & Operation Manual; Manual No. 016-0171-152: pp. 1-246, 2012: Sioux Falls, SD.

(Continued)

*Primary Examiner* — Jerrah Edwards
(74) *Attorney, Agent, or Firm* — Rebecca L. Henkel; Rickard K. DeMille (57) ABSTRACT

A touchscreen Human Machine Interface (HMI) may be used to communicate with a machine controller which, in turn, may communicate with a variety of systems of an agricultural machine to calibrate those systems. Accordingly, the HMI, via the machine controller, may communicate and interact with various electronically controlled devices of the machine, such as a joystick, a brake pedal, a hydrostatic pump system, a steering angle sensor, a rear steering controller, and the like (such as via an ISO Bus or CAN bus) to effect such calibrations.

20 Claims, 11 Drawing Sheets

(51) Int. Cl.
*A01M 7/00* (2006.01)
*G06F 3/0484* (2013.01)

(56) References Cited

U.S. PATENT DOCUMENTS

| | | | |
|---|---|---|---|
| 7,225,060 B2 * | 5/2007 | O'Connor | G01C 21/20 324/202 |
| 7,236,161 B2 | 6/2007 | Geaghan et al. | |
| 7,272,476 B2 | 9/2007 | Ortiz et al. | |
| 7,714,849 B2 | 5/2010 | Pryor | |
| 7,756,621 B2 | 7/2010 | Pillar et al. | |
| 8,065,062 B2 | 11/2011 | Prebeck et al. | |
| 8,392,084 B2 | 3/2013 | Skiles | |
| 8,583,312 B2 | 11/2013 | Schreiber | |
| 8,649,930 B2 | 2/2014 | Reeve et al. | |
| 8,718,880 B2 | 5/2014 | Cadman et al. | |
| 8,746,137 B1 | 6/2014 | Henry et al. | |
| 2003/0023395 A1 | 1/2003 | O'Mahony et al. | |
| 2006/0025894 A1 * | 2/2006 | O'Connor | G01C 21/20 701/1 |
| 2008/0312861 A1 | 12/2008 | Casto et al. | |
| 2011/0301781 A1 | 12/2011 | Karlsson et al. | |
| 2014/0163805 A1 | 6/2014 | Braunstein et al. | |
| 2016/0167653 A1 * | 6/2016 | Malone | B60W 10/18 701/23 |
| 2017/0164548 A1 * | 6/2017 | Bassett | A01B 51/02 |

OTHER PUBLICATIONS

Vbulletin Solutions, Inc.; "AeroQuad 3.x Configurator Manual"; from Web-Site—http://aeroquad.com/showwiki.php?title=AeroQuad-3-x-Configurator-Manual; pp. 1-22; 2015; US.

Clemenson University Tools; "Calibrate My Sprayer"; Android Apps on Google Play; https://play.google.com/store/apps/details?id=edu.clemson sprayercalibration&hl=en; pp. 1-2; 2015; US.

* cited by examiner

AGRICULTURAL VEHICLE CALIBRATION VIA HUMAN MACHINE INTERFACE

CROSS REFERENCE TO RELATED APPLICATIONS

This is a non-provisional application based upon U.S. provisional patent application Ser. No. 62/154,806, entitled "Agricultural Vehicle Calibration Via Human Machine Interface," filed Apr. 30, 2015, which is incorporated herein by reference.

FIELD OF THE INVENTION

The invention relates generally to agricultural product application equipment, such as self-propelled sprayers and, in particular, to a self-propelled off-road agricultural vehicle with a Human Machine Interface (HMI) provided in the cab for implementing on screen calibrations of various electronically controlled systems of the machine.

BACKGROUND OF THE INVENTION

Agricultural machines, such as self-propelled sprayers, are getting larger to increase operating efficiency, such as by covering more area in a single pass of a spraying session. The larger machines are also getting heavier. Hydraulic drive systems have been effectively used to power the wheels of these larger machines, which allows for increased ground clearance because of the absence of mechanical driveline components for the hydraulic drive systems.

Modern agricultural machines may be complex with a variety of systems and devices, such as for steering, throttle control, engine control and the like. Such electronically controlled devices are typically calibrated and configured at the factory. However, over time, excessive wear on particular components may cause such systems and devices to lose some amount of responsiveness. For example, a joystick used to control throttling might allow a full range of speed from one extreme position to the other. However, over time, excessive wear on the joystick may prevent reaching the full range of speed from either extreme position.

As a result, service personnel are typically required to interface with the electronically controlled devices, such as via an ISO bus or CAN bus, to perform diagnostics, troubleshoot components and/or re-calibrate aspects of the system. However, this may be time consuming, troublesome and expensive for the operator and service personnel.

SUMMARY OF THE INVENTION

A touchscreen Human Machine Interface (HMI) may be used to communicate with a machine controller which, in turn, may communicate with a variety of systems of an agricultural machine to calibrate those systems. Accordingly, the HMI, via the machine controller, may communicate and interact with various electronically controlled devices of the machine, such as a joystick, a brake pedal, a hydrostatic pump system, a steering angle sensor, a rear steering controller, and the like (such as via an ISO Bus or CAN bus) to effect such calibrations.

Screens on the HMI may be used by an operator, for example, to provide data with respect to input positions for achieving such calibrations. Also, on screen instructions for performing such calibrations may built right in to the HMI and/or displayed via the HMI. Also, a PIN (Personal Identification Number) may be selectively required to access one or more calibration features.

According to one aspect of the invention, a self-propelled off-road agricultural vehicle may include: a chassis supporting a cab and having wheels for moving the self-propelled off-road agricultural vehicle; an application system supported by the chassis and including at least one storage container storing a volume of product for delivery on to an agricultural field; a hydrostatic drivetrain system for delivering power to the wheels and including: an internal combustion engine supported by the chassis, a hydrostatic pump system receiving torque from the internal combustion engine and converting the torque from the internal combustion engine into hydraulic power for use by the hydrostatic drivetrain system, and hydraulic motors receiving hydraulic power from the hydrostatic pump system and arranged for delivering power for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system; and a Human Machine Interface (HMI) provided in the cab, the HMI being operable to calibrate a system of the self-propelled off-road agricultural vehicle using input from an operator.

The system may include an element selected from the group consisting of a joystick, a brake pedal, the hydrostatic pump system, a steering angle sensor and a rear steering controller. The HMI may include a touchscreen and may display instructions for calibrating the system.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
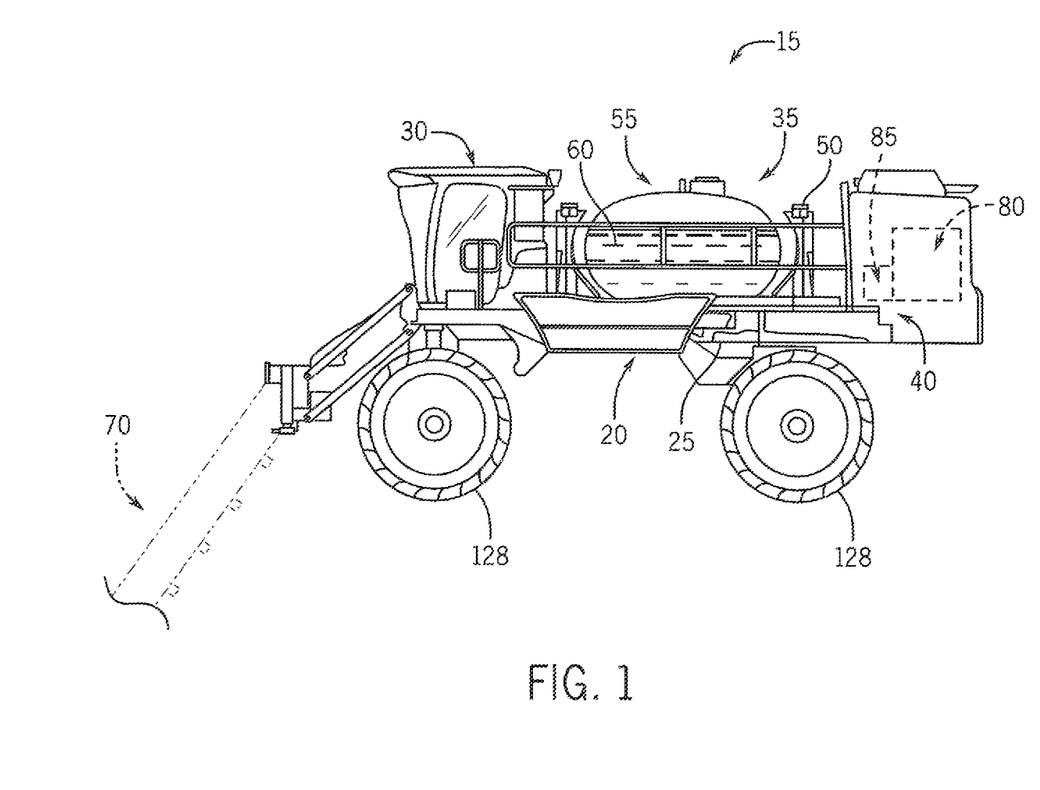
FIG. 1 is a side elevation view of self-propelled off-road agricultural vehicle with an HMI for implementing on screen calibrations according to the present invention.

Referring now to the drawings and specifically to FIG. 1, a Human Machine Interface (HMI) for implementing on screen calibrations of various electronically controlled systems is provided, explained in greater detail elsewhere herein, and is shown for use with an exemplar self-propelled off-road agricultural vehicle. The self-propelled off-road agricultural vehicle may be an agricultural applicator that deposits, for example, liquid, as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants, and other agents, such as by way of various toolbar attachments, planters, anhydrous ammonia applicators, and others. The self-propelled off-road agricultural vehicle as agricultural applicator may be a sprayer and is shown here by way of example as a self-propelled sprayer 15. The sprayer 15 is shown as a front-mounted boom self-propelled sprayer such as those available from CNH Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well boom-less sprayers, tiered booms, and detachable sprayers.

Still referring to FIG. 1, sprayer 15 includes chassis 20 having chassis frame 25 that supports various assemblies, systems, and components. These various assemblies, systems, and components include a cab 30, and an application system shown as spray system 35, and a hydrostatic drivetrain system 40. Spray system 35 includes storage containers such as rinse tank 50 storing water or a rinsing solution and product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height-adjustable boom of a boom system 70 for release out of spray nozzles that are spaced from each other along the width of the boom during spraying operations of sprayer 15.

Figure 2:
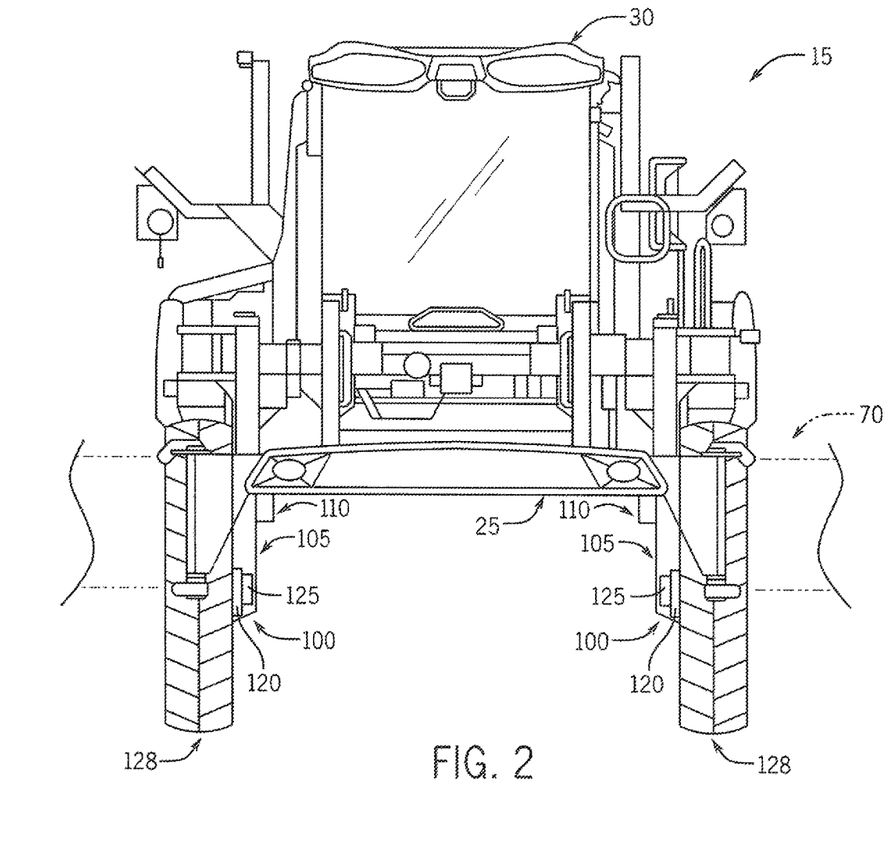
FIG. 2 is a front elevation view of the self-propelled off-road agricultural vehicle of FIG. 1.
Figure 3:
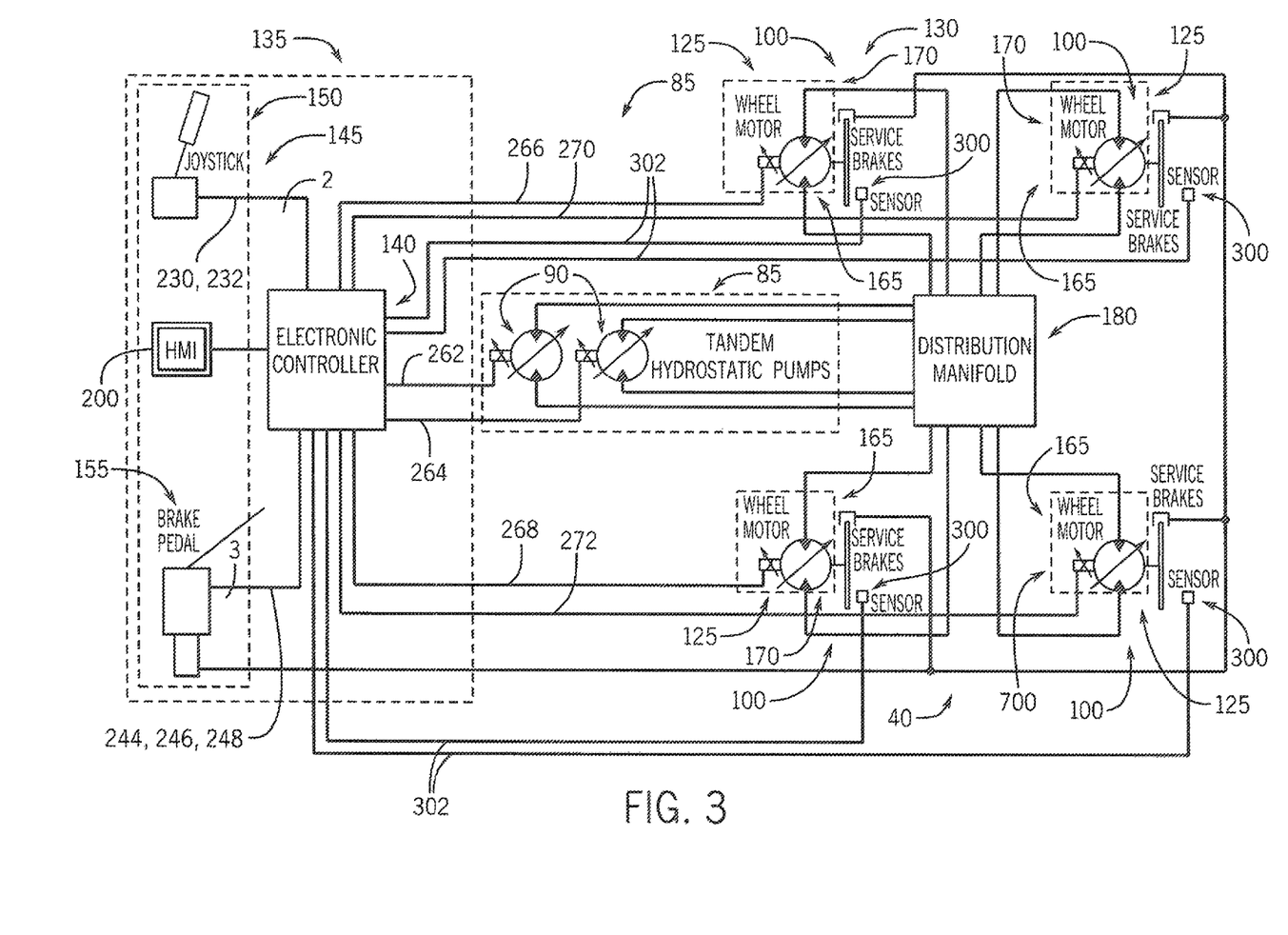
FIG. 3 is a simplified schematic representation of a circuit illustrating various systems according to the present invention.

Still referring to FIG. 1, the hydrostatic drivetrain system 40 includes an engine 80 and hydrostatic pump system 85 that receives power from the engine 80. FIG. 3 shows the hydrostatic pump system 85 as having a tandem pair of variable displacement hydrostatic pumps 90. Referring now to FIG. 2, wheel drives 100 are supported at bottom ends of legs 105 that extend from swing arms 110 that are pivot mounted to the chassis frame 25. Each wheel drive 100 may include a planetary gear set 120 and a hydraulic motor as a wheel motor 125 which may be a variable displacement wheel motor (see also FIG. 3) that directly drives the planetary gear set 120 to establish a direct drive relationship between each wheel drive 100 and its respective wheel 128 of the sprayer 15.

Referring now to FIG. 3, a propel circuit 130 is shown that includes the hydrostatic pump system 85, wheel motors 125, and control system 135 that controls the propel circuit 130. The control system 135 includes at least one electronic controller 140 that is configured to control operations of the hydrostatic drivetrain system 40. The electronic controller 140 may include a microprocessor, microcontroller or other logic, such as a Programmable Logic Controller (PLC) or industrial computer, along with corresponding software and suitable memory for storing such software and hardware including interconnecting conductors for power and signal transmission and communication for controlling electronic, electro-mechanical, and hydraulic components of the hydrostatic drivetrain system 40. Communication may be accomplished through direct interconnection such as directly routed wiring harnesses or through one or more serial bus systems such as a CAN (Controller Area Network) bus(es) between the electronic controller 140 and the sensors, actuators, and/or other components of the sprayer 15 for monitoring and controlling corresponding systems and components of the hydrostatic drivetrain system 40, such as to control direction, speed and braking of the sprayer 15.

Still referring to FIG. 3, the control system 135 includes operator controls 145, which provide a user interface(s) allowing an operator to control hydrostatic drivetrain system 40 and other components of the sprayer 15. The operator controls 145 include a joystick 150 that has a grip with buttons for controlling various corresponding functions of the sprayer 15 including controlling operations of the boom system 70, such as boom height and tilt and spray delivery patterns, as well as controlling movement characteristics of the sprayer 15 such as range and speed controls. Moving the joystick 150 forward and/or backward with respect to a neutral gate may control direction and speed of travel of the sprayer 15. The operator controls 145 also include a brake pedal 155 with an integrated brake valve delivering pressurized hydraulic fluid upon depressing the brake pedal 155 to engage service brakes 160 at each wheel drive 100 to slow rotation of the respective wheel motor 125. Depressing the brake pedal 155 may also send a corresponding signal to the electronic controller 140, which sends a signal to the hydrostatic pump system 85 as a deceleration command to the pumps 90 for slowing the sprayer 15. A distribution manifold 180 may operably interconnect the hydrostatic pump system 85 to each of the wheel motors 125. Each wheel motor 125 has an inlet side 165 receiving hydraulic fluid and an outlet side 170 returning hydraulic fluid toward the hydrostatic pump system 85. Since wheel motors 125 can bi-directionally rotate, the inlet and outlet sides 165 and 170, respectively, may be opposite depending on which direction the wheel motors 125 are rotating.

Still referring to FIG. 3, a touchscreen HMI 200 for implementing on screen calibrations of various electronically controlled systems of the sprayer 15 is provided. The HMI 200 includes a touchscreen allowing high resolution color graphic display with the capability of receiving of touch commands on the screen from an operator. The HMI 200 may connect to a machine controller, such as the electronic controller 140, for example, such as via an Society of Automotive Engineers (SAE) J1939 bus, International Organization for Standardization (ISO) 11783 (ISOBUS), ISO 11898 bus and/or other Controller Area Network (CAN) bus. Accordingly, the HMI 200, via the electronic controller 140, may communicate and interact with various systems and electronically controlled devices of the sprayer 15 to effect calibrations.

Figure 4:
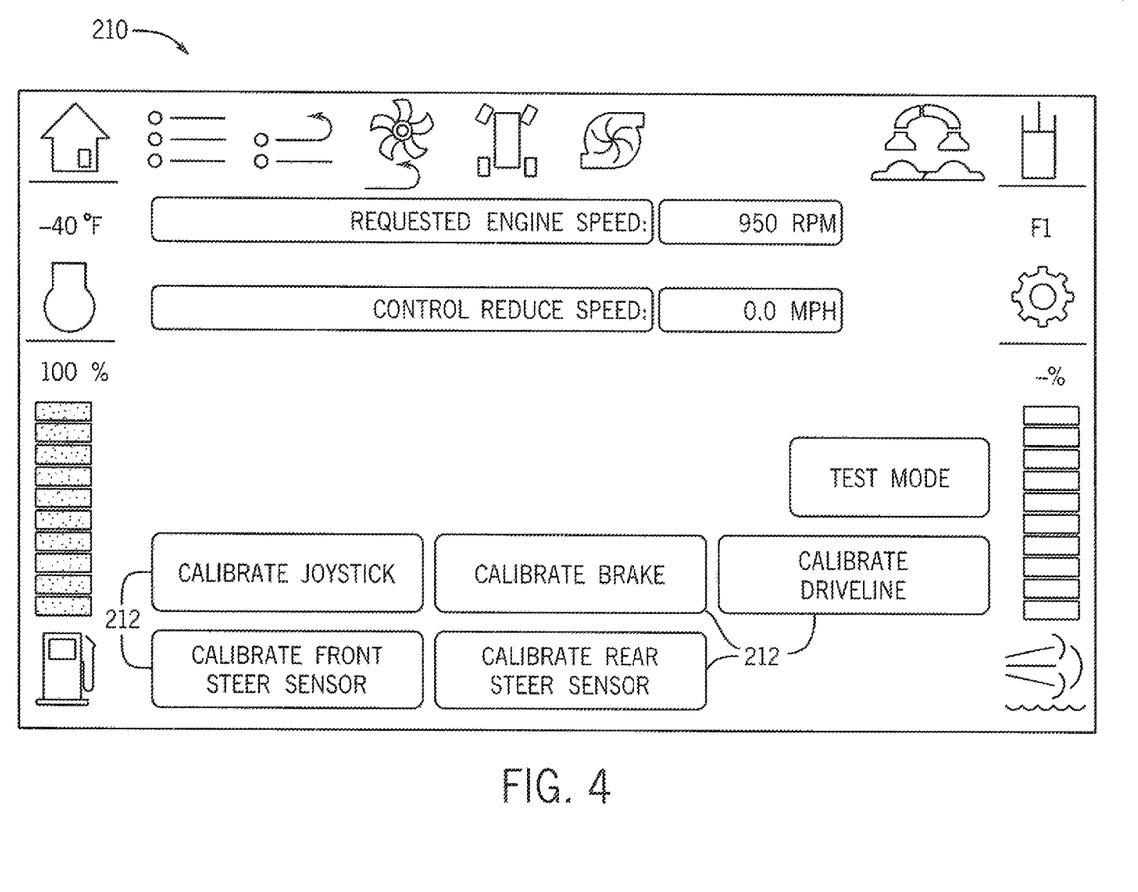
FIG. 4 is an exemplar view provided to an HMI for selecting calibration of a system according to the present invention.

Referring now to FIG. 4, an exemplar calibration screen 210 may be provided to the HMI 200 for selecting calibration of a particular system by an operator of the sprayer 15. The HMI 200 may provide one or more calibration icons 212 corresponding to a particular system or device of the sprayer 15. Touching a calibration icon 212 allows proceeding to a next screen for calibration of the selected system or device. The calibration icons 212 may correspond, for example, to "Calibrate Joystick," "Calibrate Brake," "Calibrate Driveline," "Calibrate Front Steer Sensor," and/or "Calibrate Rear Steer Sensor. A system may preferably be selected for calibration, for example via calibration icon 212, if a related component has been susceptible to wear, serviced, replaced or otherwise in need of correction or adjustment. Optionally, a PIN (Personal Identification Number) may be selectively required to access the calibration screen 210 and/or one or more of the calibration icons 212.

Calibrations of various systems of the sprayer 15 will now be described by way of example. It should be appreciated that many other systems and/or devices may be similarly calibrated as described within the scope of the invention.

Joystick Calibration

Figure 5:
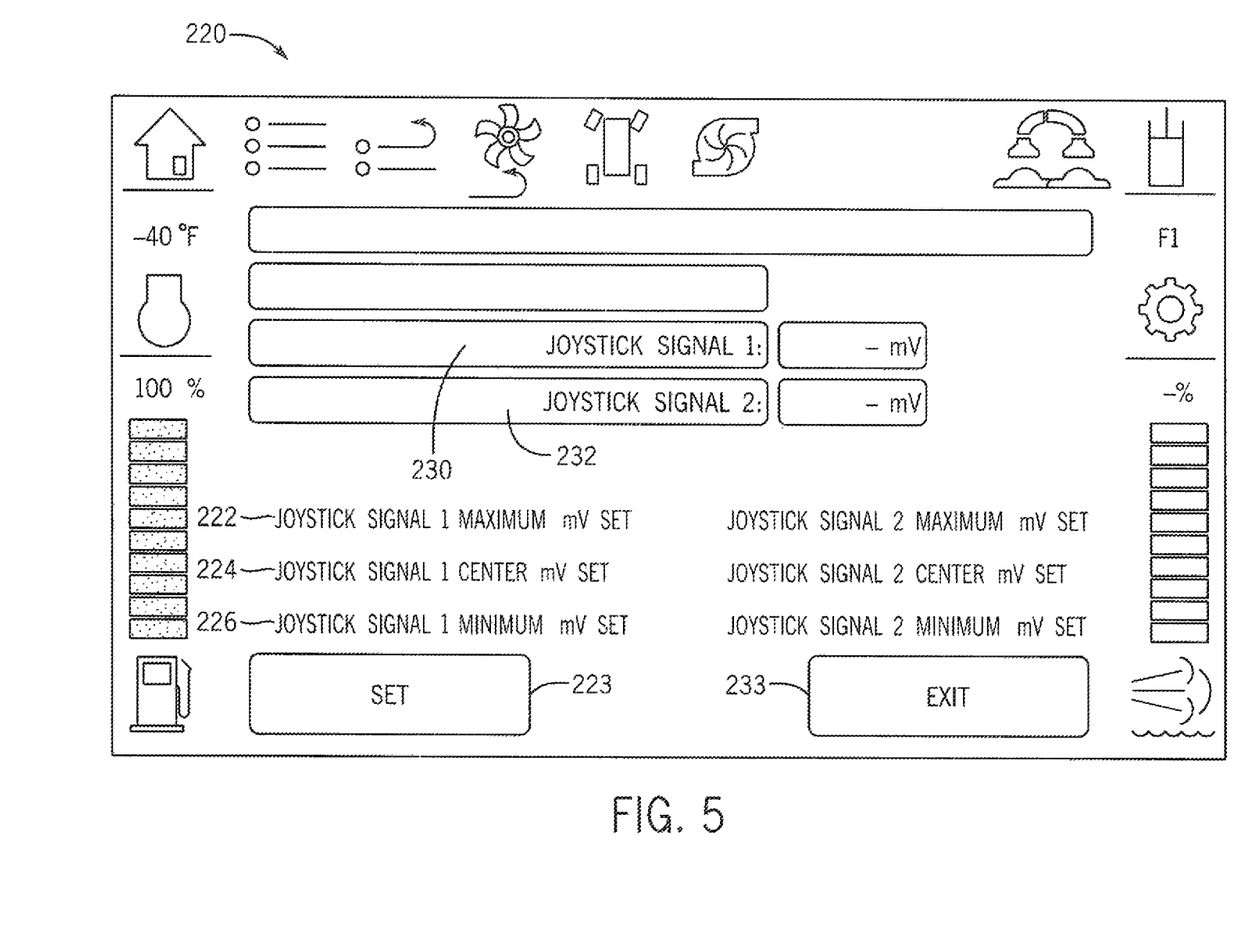
FIG. 5 is an exemplar view provided for calibration of a joystick according to the present invention.

Referring now to FIG. 5, an exemplar joystick calibration screen 210 is provided for calibration of the joystick 150. As described above with respect to FIG. 3, the operator controls 145 include the joystick 150 that has a grip with buttons for controlling various corresponding functions of the sprayer 15 including controlling operations of the boom system 70, such as boom height and tilt and spray delivery patterns, as well as controlling movement characteristics of the sprayer 15 such as range and speed controls. Moving the joystick 150 forward and/or backward with respect to a neutral gate may control direction and speed of travel of the sprayer 15.

Selecting "Calibrate Joystick," via the corresponding calibration icon 212 on the calibration screen 210, may result in the joystick calibration screen 210 being displayed next. Then, the HMI 200 may display on screen instructions, which may be programmed in the HMI 200, for guiding the operator through various steps for completing the calibration.

In one aspect, the HMI 200 may guide the operator to position the joystick 150 in a first (maximum) joystick position 222, such as fully forward with respect to the neutral gate. The HMI 200 may prompt the operator to touch the "Set" icon 223, at which point the HMI 200 may read a first electrical signal strength from the electronic controller 140 (in electrical communication with the joystick 150) which corresponds to the first (maximum) joystick position 222. Then, the HMI 200 may guide the operator to position the joystick 150 in a second (center) joystick position 224, such as in the neutral gate. The HMI 200 may again prompt the operator to touch the "Set" icon 223, at which point the HMI 200 may then read a second electrical signal strength from the electronic controller 140 which corresponds to the second (center) joystick position 224. Finally, the HMI 200 may guide the operator to position the joystick 150 in a third (minimum) joystick position 226, such as fully backward with respect to the neutral gate. The HMI 200 may again prompt the operator to touch the "Set" icon 223, at which point the HMI 200 may then read a third electrical signal strength from the electronic controller 140 which corresponds to the third (minimum) joystick position 226.

The aforementioned steps may be repeated for multiple signals, such as with respect to a first joystick signal 230 ("Signal 1") and a second joystick signal 232 ("Signal 2"). This may be provided, for example, for calibrating alternative input commands mechanisms which may be provided by the joystick 150. Also, calibration may be cancelled (without completion) by touching an "Exit" icon 233.

As described herein, the electrical signal strengths may be expressed in various forms as it may be sensed, detected and/or calculated, such as by the electronic controller 140. For example, the electrical signal strengths may be expressed as currents (e.g., milliamps or mA), voltages (e.g., millivolts of mV) and/or a power.

Brake Pedal Calibration

Figure 6:
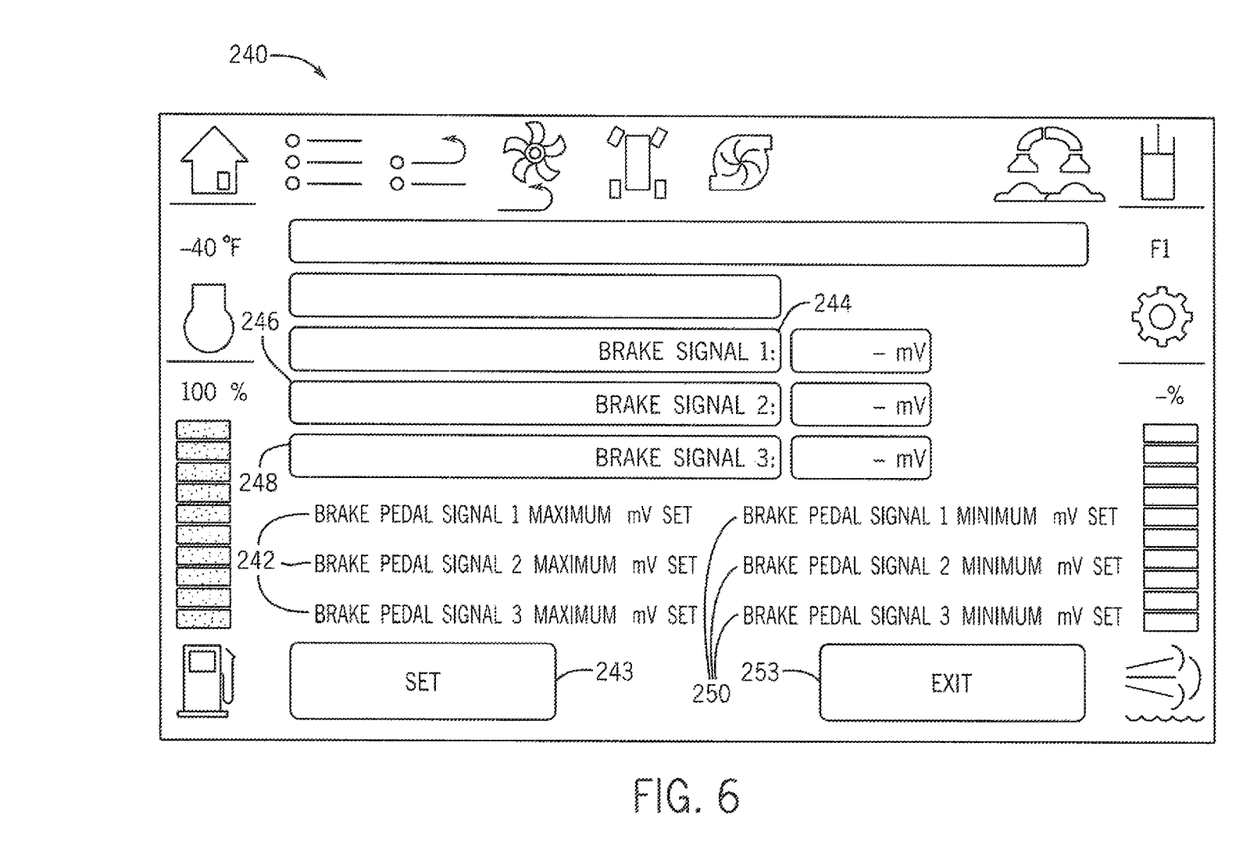
FIG. 6 is an exemplar view provided for calibration of a brake pedal according to the present invention.

Referring now to FIG. 6, an exemplar brake pedal calibration screen 220 is provided for calibration of the brake pedal 155. As described above with respect to FIG. 3, the operator controls 145 also include the brake pedal 155 with an integrated brake valve delivering pressurized hydraulic fluid upon depressing the brake pedal 155 to engage service brakes 160 at each wheel drive 100 to slow rotation of the respective wheel motor 125. Depressing the brake pedal 155 may also send a corresponding signal to the electronic controller 140, which sends a signal to the hydrostatic pump system 85 as a deceleration command to the pumps 90 for slowing the sprayer 15.

Selecting "Calibrate Brake," via the corresponding calibration icon 212 on the calibration screen 210, may result in the brake pedal calibration screen 220 being displayed next. Then, the HMI 200 may display on screen instructions, which may be programmed in the HMI 200, for guiding the operator through various steps for completing the calibration.

In one aspect, the HMI 200 may guide the operator to position the brake pedal 155 in a first (maximum) brake pedal position 242, such as a fully depressed position. The HMI 200 may prompt the operator to touch the "Set" icon 243, at which point the HMI 200 may read a plurality of electrical signal strengths from the electronic controller 140 (in electrical communication with the brake pedal 155) which correspond to the first (maximum) brake pedal position 242. For example, the HMI 200 may read a first brake signal 244 ("Brake Signal 1") (such as representing a positively sensed or measured reference), a second brake signal 246 ("Brake Signal 2") (such as representing a separate negatively sensed or measured reference) and a third brake signal 248 ("Brake Signal 3") (such as representing a separate mid-point sensed or measured reference). Such multiple signals with varying references may provide, for example, increased safety and reliability.

Then, the HMI 200 may guide the operator to position the brake pedal 155 in a second (minimum) brake pedal position 250, such as a fully released position. The HMI 200 may again prompt the operator to touch the "Set" icon 243, at which point the HMI 200 may read a plurality of electrical signal strengths from the electronic controller 140 which correspond to the second (minimum) brake pedal position 250. For example, the HMI 200 may again read the first brake signal 244, the second brake signal 246 and the third brake signal 248. Calibration may be cancelled (without completion) by touching an "Exit" icon 253.

Hydrostatic Pump System Calibration

Referring now to FIG. 6, an exemplar hydrostatic pump system calibration screen 260 is provided for calibration of the hydrostatic pump system 85. As described above with respect to FIG. 3, the electronic controller 145 is in communication with a tandem pair of variable displacement hydrostatic pumps 90 which is, in turn, in communication with a distribution manifold 180. The distribution manifold 180 may operably interconnect the hydrostatic pump system 85 to each of the wheel motors 125. Each wheel motor 125 has an inlet side 165 receiving hydraulic fluid and an outlet side 170 returning hydraulic fluid toward the hydrostatic pump system 85. Since wheel motors 125 can bi-directionally rotate, the inlet and outlet sides 165 and 170, respectively, may be opposite depending on which direction the wheel motors 125 are rotating. Respective pumps/motors of hydrostatic pump system 85 may include, for example, coils which may receive electrical currents for electromagnetically actuating swashplates to tilt at varying angles for producing varying pressure flows within the system. The minimum amount of current (minimum value) required for initially actuating a motor (such as the current required to initially tilt the swashplate) may be calibrated at each point in the system. Similarly, the maximum amount of current (maximum value) required for fully actuating a motor (such as the least amount of current required to completely tilt the swashplate) may be calibrated at each point in the system.

Figure 7:
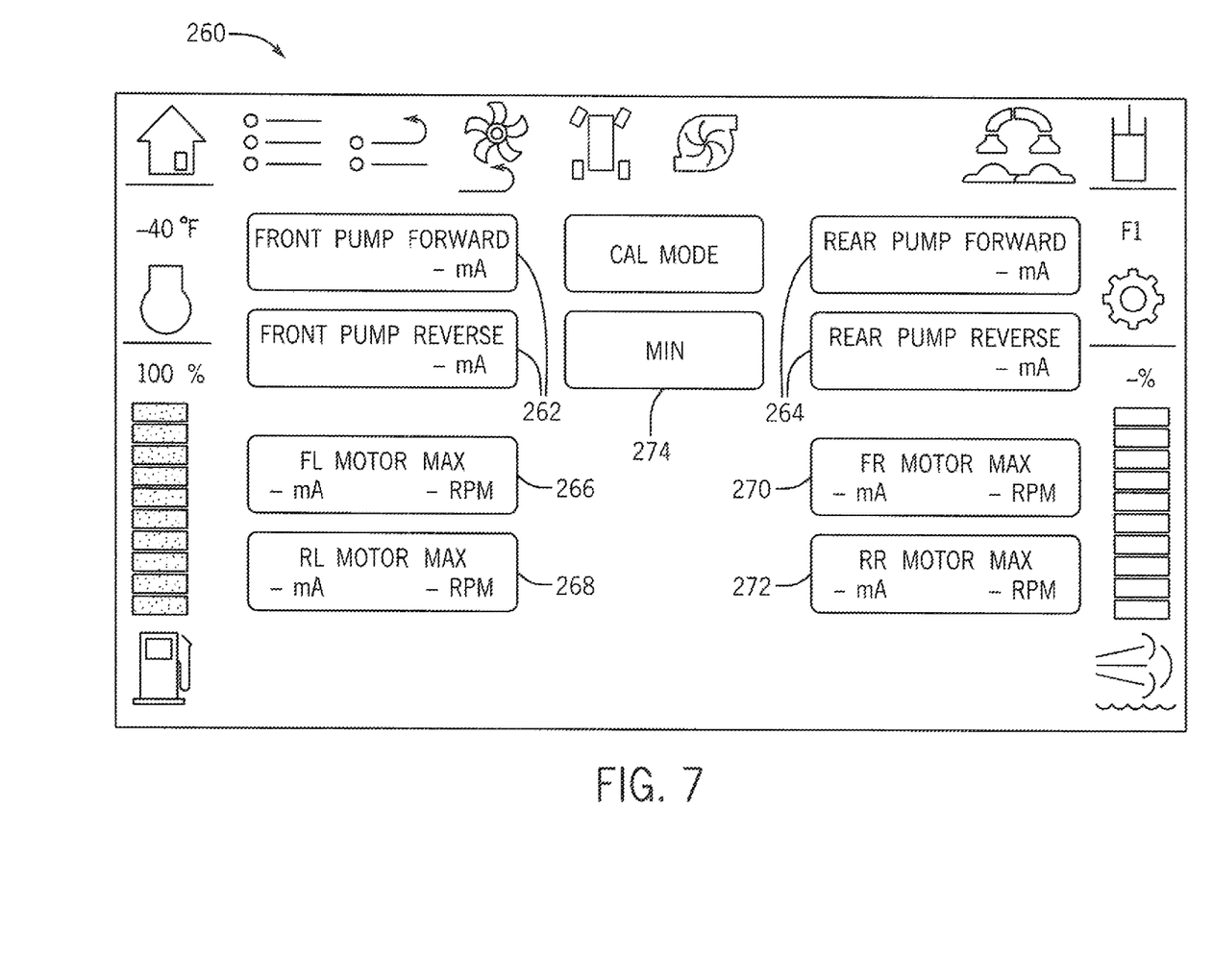
FIG. 7 is an exemplar view provided for calibration of a hydrostatic pump system according to the present invention.

Selecting "Calibrate Driveline," via the corresponding calibration icon 212 on the calibration screen 210, may result in the hydrostatic pump system calibration screen 260 being displayed next. Then, the HMI 200 may display on screen instructions, which may be programmed in the HMI 200, for guiding the operator through various steps for completing the calibration.

In one aspect, the HMI 200 may guide the operator to position a throttle of the sprayer 15 in a first (maximum) throttle position, such as the joystick fully forward with respect to the neutral gate. The HMI 200 may then read a plurality of corresponding electrical signal strengths of the hydrostatic pump system 85 (via the electronic controller 140) such as: a front pump signal 262 (forward), a rear pump signal 264 (forward), a front-left wheel motor signal 266 (maximum), a rear-left wheel motor signal 268 (maximum), a front-right wheel motor signal 270 (maximum) and a rear-right wheel motor signal 272 (maximum). These electrical signal strengths may represent, for example, maximum values required for fully actuating the respective motors (in other words, a value providing just enough current necessary to fully actuate the respective motors or completely tilt the swashplate).

Then, the HMI 200 may guide the operator to position a throttle of the sprayer 15 in a second (minimum) throttle position, such as the joystick fully backward with respect to the neutral gate. The operator may alternatively touch the "Min" icon 274 to enter the second (minimum) throttle position mode (which icon transitions between "Max" and "Min" depending on mode). The HMI 200 may then again read a plurality of corresponding electrical signal strengths of the hydrostatic pump system 85 (via the electronic controller 140) such as: the front pump signal 262 (backward), the rear pump signal 264 (backward), the front-left wheel motor signal 266 (minimum), the rear-left wheel motor signal 268 (minimum), the front-right wheel motor signal 270 (minimum) and the rear-right wheel motor signal 272 (minimum). These electrical signal strengths may represent, for example, minimum values required for initially actuating the respective motors (in other words, a value providing just enough current necessary to initially actuate the respective motors or initially tilt the swashplate).

Steering Angle Calibration

Figure 8:
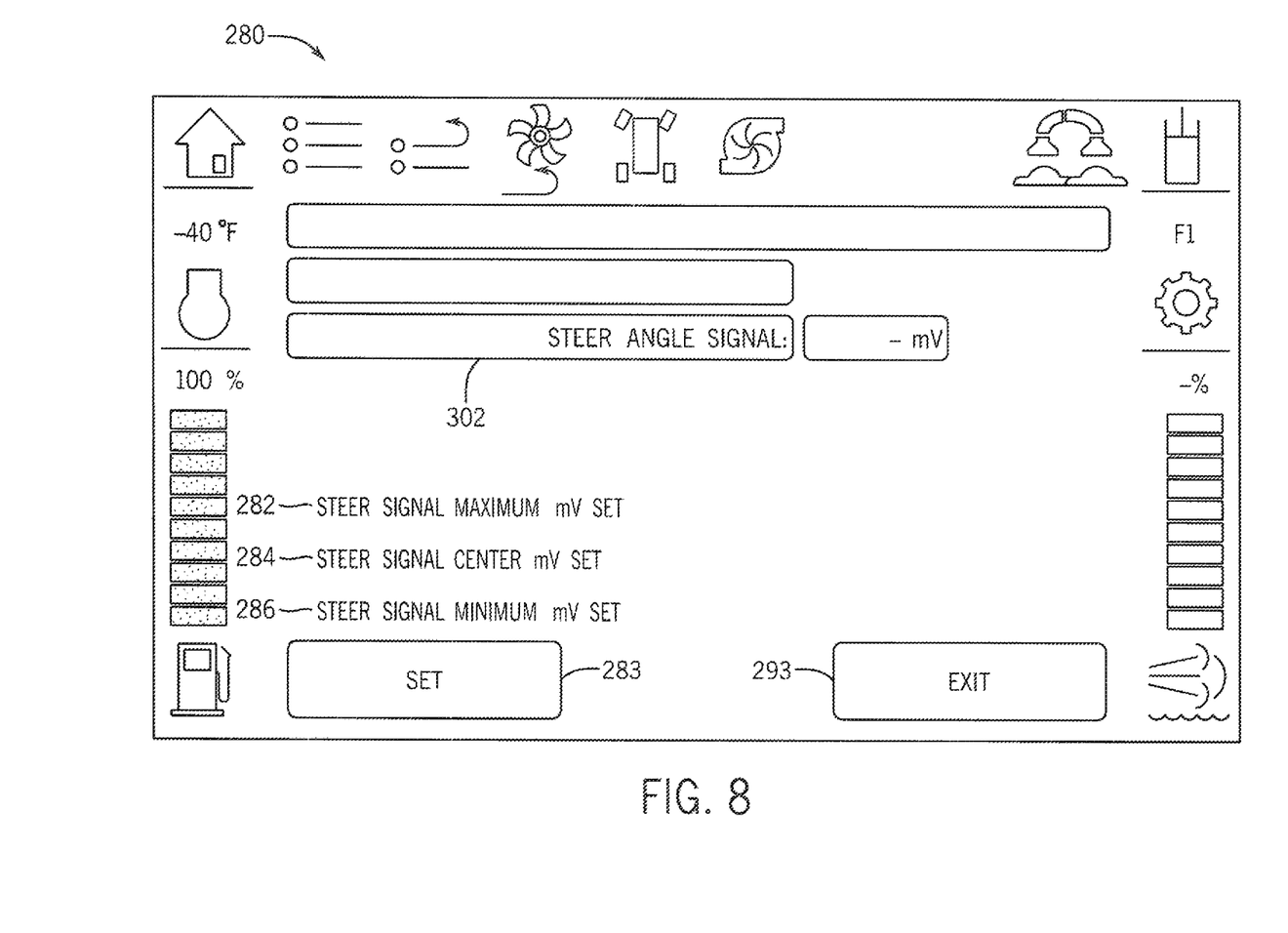
FIG. 8 is an exemplar view provided for calibration of a steering angle according to the present invention.

Referring now to FIG. 8, an exemplar steering angle calibration screen 280 is provided for calibration of a steering angle of the sprayer 15. Steering angle may be calibrated with respect to the front wheels or the rear wheels. Accordingly, the steering angle calibration screen 280 could correspond to a calibration screen for calibrating the front wheels or the rear wheels.

Selecting "Calibrate Front Steer Sensor" or "Calibrate Rear Steer Sensor" via the corresponding calibration icons 212 on the calibration screen 210 may result in the steering angle calibration screen 280 being displayed next. Then, the HMI 200 may display on screen instructions, which may be programmed in the HMI 200, for guiding the operator through various steps for completing the calibration.

In one aspect, the HMI 200 may guide the operator to position the steering mechanism in a first (maximum) steering position 282, such as a fully turned to the right. The HMI 200 may prompt the operator to touch the "Set" icon 283, at which point the HMI 200 may read one or more electrical signal strengths from the electronic controller 140 (in electrical communication with one or more front or rear steering angle wheel sensors 300 via one or more steering angle signals 302) which corresponds to the first (maximum) steering position 282. Then, the HMI 200 may guide the operator to position the steering mechanism in a second (center) steering position 284, such as substantially centered with the wheels straight. The HMI 200 may again prompt the operator to touch the "Set" icon 283, at which point the HMI 200 may then read one or more second electrical signal strengths from the electronic controller 140 which corresponds to the second (center) steering position 284. Finally, the HMI 200 may guide the operator to position the steering mechanism in a third (minimum) steering position 286, such as a fully turned to the left. The HMI 200 may again prompt the operator to touch the "Set" icon 283, at which point the HMI 200 may then read one or more third electrical signal strengths from the electronic controller 140 which corresponds to the third (minimum) steering position 286. Calibration may be cancelled (without completion) by touching an "Exit" icon 293.

Rear Steering Calibration

Figure 9:
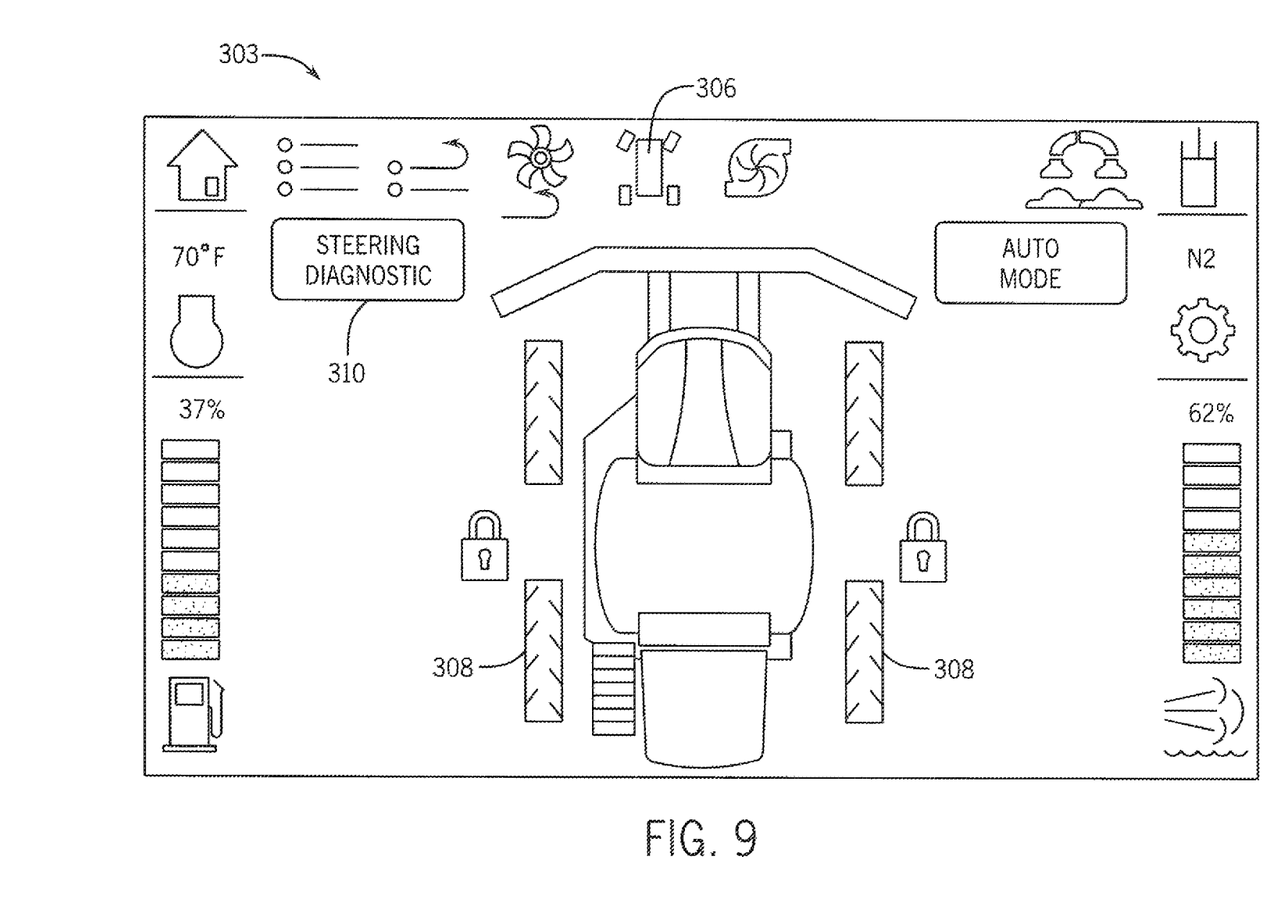
FIG. 9 is an exemplar first view provided for calibration of rear steering according to the present invention.

Referring now to FIG. 9, an exemplar rear steering calibration screen 303 is provided for calibration of rear steering according to the present invention. Selecting a suitable calibration icon 212 on the calibration screen 210, and/or touching a Four Wheel Steer icon 306, may result in the rear steering calibration screen 303 being displayed. Then, the HMI 200 may display on screen instructions, which may be programmed in the HMI 200, for guiding the operator through various steps for completing the calibration.

Figure 10:
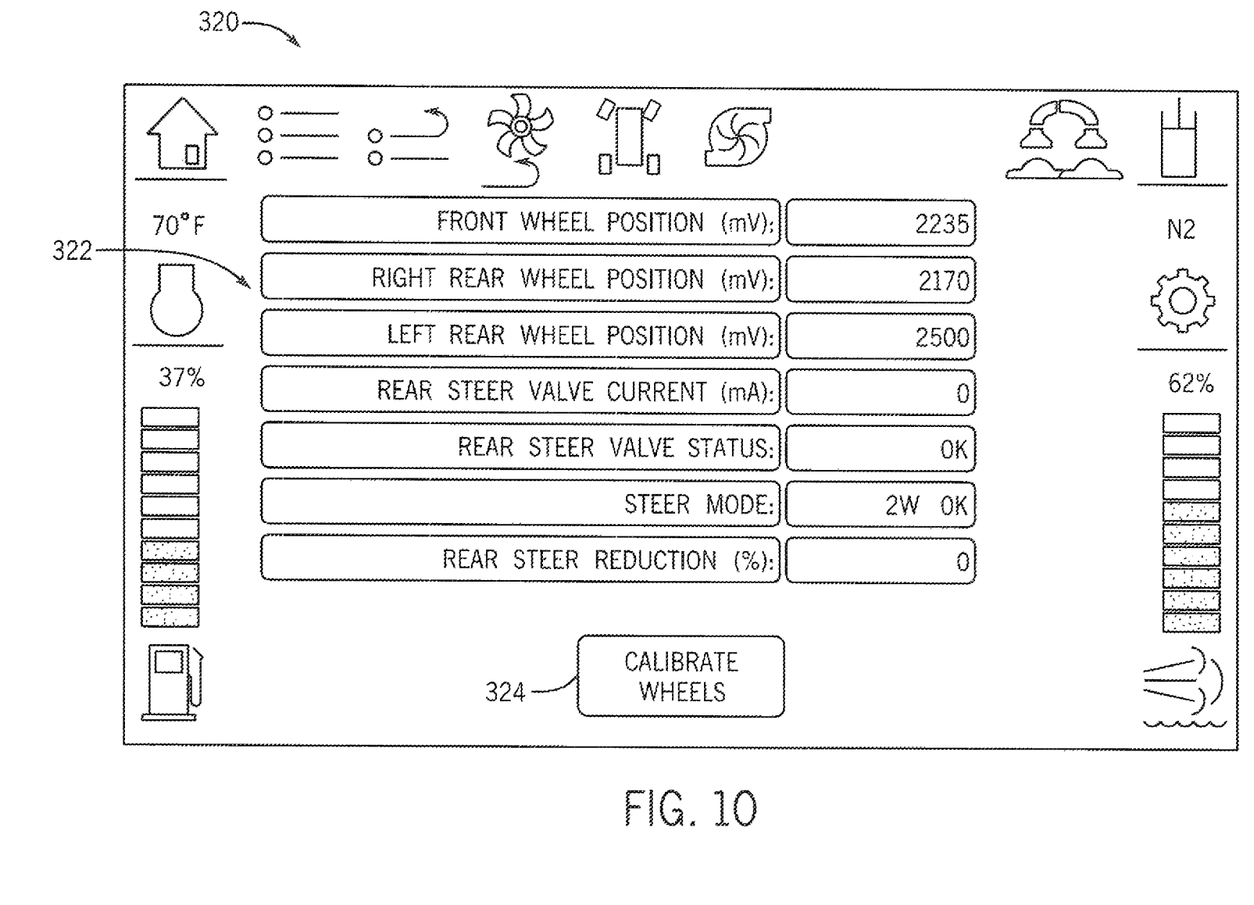
FIG. 10 is an exemplar second view provided for calibration of rear steering according to FIG. 9.

From rear steering calibration screen 303, the operator may steer the rear wheels either right or left by touching the appropriate rear wheel icons 308. With the rear wheels positioned substantially straight by the operator, the rear wheels may undergo calibration by touching the "Steering Diagnostics" icon 310. Referring also to FIG. 10, touching the "Steering Diagnostics" icon 310 may result in the rear steering readings screen 320 being displayed. The rear steering readings screen 320 may provide a plurality of electrical steering readings 322, such as front wheel position, right rear wheel position, left rear wheel position, rear steer valve current, rear steer valve status, current steer mode and rear steer reduction. Such readings may be sensed and/or calculated by the electronic controller 140 (such as, for example, via one or more front or rear steering angle wheel sensors 300).

Figure 11:
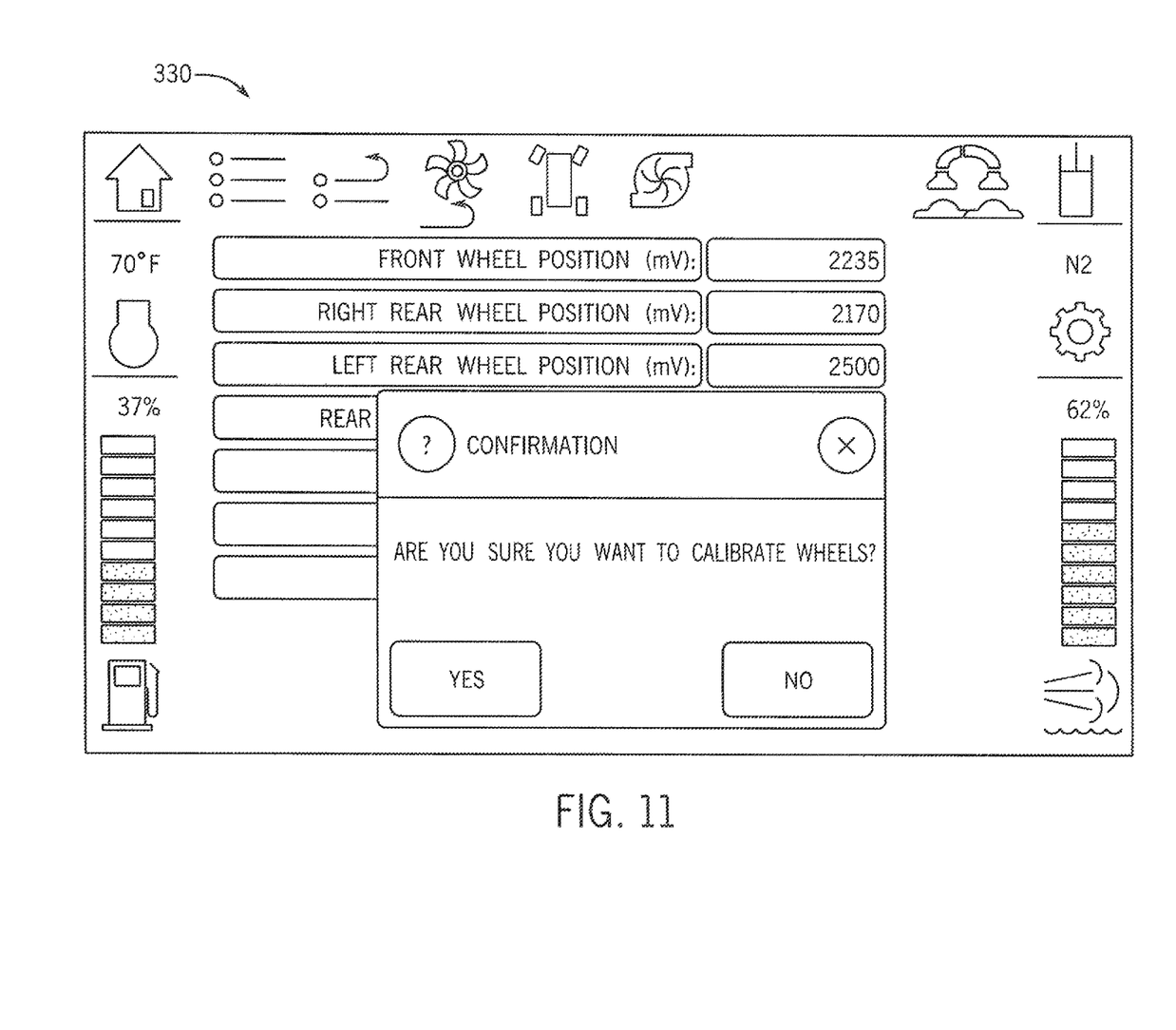
FIG. 11 is an exemplar third view provided for calibration of rear steering according to FIGS. 9 and 10.

Once the wheels are all calibrated, the operator may touch the "Calibrate Wheels" icon 324 to initiate calibration. Referring also to FIG. 11, after touching the "Calibrate Wheels" icon 324, a confirmation screen 330 asking "Are you sure you want to calibrate wheels?" may be presented. Touching "yes" will calibrate the electrical steering readings 322 with the wheels in a substantially straight position. Touching "no" may allow more adjustment prior, such as steering the rear wheels either right or left by touching the appropriate rear wheel icons 304, prior to calibration.

Many changes and modifications could be made to the invention without departing from the spirit thereof. The scope of these changes will become apparent from the appended claims.

We claim:

1. A self-propelled agricultural vehicle comprising:
a chassis supporting a cab and having wheels for moving the self-propelled off-road agricultural vehicle;
an application system supported by the chassis and including at least one storage container storing a volume of product for delivery on to an agricultural field;
a hydrostatic drivetrain system for delivering power to the wheels and including:
an internal combustion engine supported by the chassis,
a hydrostatic pump system receiving torque from the internal combustion engine and converting the torque from the internal combustion engine into hydraulic power for use by the hydrostatic drivetrain system, the hydrostatic pump system including an input being operable by an operator in the cab of the chassis to control operation of the hydrostatic pump system, and
hydraulic motors receiving hydraulic power from the hydrostatic pump system and arranged for delivering power for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system;
a joystick provided in the cab, the joystick having a grip and buttons being operable by an operator in the cab of the chassis to control various functions of the application system; and
a Human Machine Interface (HMI) provided in the cab, the HMI including a joystick selector and a hydrostatic pump system selector;
wherein:
the HMI is configured to enter a joystick calibration mode in response to selection of the joystick selector by the operation, the HMI being operable in the joystick calibration mode to calibrate the joystick of the self-propelled off-road agricultural vehicle in response to an input to the joystick by the operator in the cab of the chassis; and
the HMI is configured to enter a hydrostatic bump system calibration mode in response to selection of hydrostatic pump system selector, the HMI being operable in the hydrostatic pump system calibration mode to calibrate the hydrostatic pump system of the self-propelled off-road agricultural vehicle in response to an input to the hydrostatic pump system by an operator in the cab of the chassis.

2. The self-propelled agricultural vehicle of claim 1, further comprising a brake system having a brake at each wheel and a brake pedal for delivering pressurized hydraulic fluid to the brake system, wherein the HMI is operable to calibrate the brake system.

3. The self-propelled agricultural vehicle of claim 2, wherein the HMI is operable to calibrate the brake pedal by determining electrical signal strengths at a plurality of brake pedal positions.

4. The self-propelled agricultural vehicle of claim 1, further comprising a steering angle sensor and a rear steering controller, wherein the HMI is further operable to calibrate at least one of: the steering angle sensor and the rear steering controller.

5. The self-propelled agricultural vehicle of claim 4, wherein the HMI is operable to calibrate the steering angle sensor by determining electrical signal strengths at a plurality of wheel positions sensed by the steering angle sensor.

6. The self-propelled agricultural vehicle of claim 5, wherein the HMI is operable to calibrate the rear steering controller by determining electrical signal strengths at a plurality of wheel positions sensed by the steering angle sensor.

7. The self-propelled agricultural vehicle of claim 2, wherein the HMI is operable to calibrate the joystick by determining electrical signal strengths at a plurality of joystick positions.

8. The self-propelled agricultural vehicle of claim 2, wherein the HMI is operable to calibrate the hydrostatic pump system by determining electrical signal strengths at a plurality of pump positions.

9. The self-propelled agricultural vehicle of claim 1, wherein the HMI is operable to calibrate the at least one of the joystick and the hydrostatic pump system by determining electrical signal strengths corresponding to minimum and maximum values.

10. The self-propelled agricultural vehicle of claim 1, wherein the HMI includes a touchscreen.

11. The self-propelled agricultural vehicle of claim 10, wherein the HMI is operable to display instructions for performing a calibration.

12. A self-propelled agricultural vehicle comprising:
a chassis supporting a cab and having wheels for moving the self-propelled off-road agricultural vehicle;
an application system supported by the chassis and including at least one storage container storing a volume of product for delivery on to an agricultural field;
a hydrostatic drivetrain system for delivering power to the wheels and including:
an internal combustion engine supported by the chassis,
a hydrostatic pump system receiving torque from the internal combustion engine and converting the torque from the internal combustion engine into hydraulic power for use by the hydrostatic drivetrain system, the hydrostatic pump system including an input being operable by an operator in the cab of the chassis to control operation of the hydrostatic pump system,
hydraulic motors receiving hydraulic power from the hydrostatic pump system and arranged for delivering power for rotating the wheels, wherein each hydraulic motor has an inlet side receiving hydraulic fluid into the hydraulic motor from the hydrostatic pump system for driving rotation of the wheels and an outlet side releasing hydraulic fluid out of the hydraulic motor toward the hydrostatic pump system;

a brake system having a brake at each wheel; and operator controls provided in the cab, the operator controls including:

a joystick having a grip and buttons being operable by an operator in the cab of the chassis to control various functions of the application system;

a brake pedal for delivering pressurized hydraulic fluid to the brake system, the brake pedal being operable by an operator in the cab of the chassis to control the brakes at each wheel; and a touchscreen Human Machine Interface (HMI) provided in the cab, including a joystick selector, a hydrostatic pump system selector and a brake system selector;

wherein:

the HMI is configured to enter a joystick calibration mode in response to selection of the joystick selector by the operation, the HMI being operable in the joystick calibration mode to calibrate the joystick of the self-propelled off-road agricultural vehicle in response to an input to the joystick by the operator in the cab of the chassis;

the HMI is configured to enter a hydrostatic pump system calibration mode in response to selection of the hydrostatic pump system selector, the HMI being operable in the hydrostatic pump system calibration mode to calibrate the hydrostatic pump system of the self-propelled off-road agricultural vehicle in response to an input to the hydrostatic pump system by the operator in the cab of the chassis; and the HMI is configured to enter a brake system calibration mode in response to selection of the brake system selector, the HMI being operable in the brake system calibration mode to calibrate the brake system of the self-propelled off-road agricultural vehicle in response to input from the brake system by an operator in the cab of the chassis.

13. The self-propelled agricultural vehicle of claim 12, further comprising a steering angle sensor and a rear steering controller, wherein the HMI is further operable to calibrate the steering angle sensor and the rear steering controller.

14. The self-propelled agricultural vehicle of claim 13, wherein the HMI is operable to calibrate the steering angle sensor by determining electrical signal strengths at a plurality of wheel positions sensed by the steering angle sensor.

15. The self-propelled agricultural vehicle of claim 13, wherein the HMI is operable to calibrate the rear steering controller by determining electrical signal strengths at a plurality of wheel positions sensed by the steering angle sensor.

16. The self-propelled agricultural vehicle of claim 12, wherein the HMI is operable to calibrate the joystick by determining electrical signal strengths at a plurality of joystick positions.

17. The self-propelled agricultural vehicle of claim 12, wherein the HMI is operable to calibrate the brake pedal by determining electrical signal strengths at a plurality of brake pedal positions.

18. The self-propelled agricultural vehicle of claim 12, wherein the HMI is operable to calibrate the hydrostatic pump system by determining electrical signal strengths at a plurality of pump positions.

19. The self-propelled agricultural vehicle of claim 12, wherein the HMI is operable to calibrate the at least one of the joystick, the brake system and the hydrostatic pump system by determining electrical signal strengths corresponding to minimum and maximum values.

20. The self-propelled agricultural vehicle of claim 12, wherein the HMI is operable to display instructions for performing a calibration.

* * * * *